A. J. HUMPHREYS.
Grain-Separators.

No. 208,175.  Patented Sept. 17, 1878.

2 Sheets—Sheet 1.

WITNESSES  
Robert Ewart  
James J. Sheehy

INVENTOR.  
Andrew J. Humphreys.  
Gilmore, Smith & Co.  
ATTORNEYS.

2 Sheets—Sheet 2

A. J. HUMPHREYS.
Grain-Separators.

No. 208,175.  Patented Sept. 17, 1878.

WITNESSES
INVENTOR
ATTORNEYS.

UNITED STATES PATENT OFFICE.

ANDREW J. HUMPHREYS, OF GAP MILLS, WEST VIRGINIA.

IMPROVEMENT IN GRAIN-SEPARATORS.

Specification forming part of Letters Patent No. 208,175, dated September 17, 1878; application filed July 6, 1878.

*To all whom it may concern:*

Be it known that I, ANDREW J. HUMPHREYS, of Gap Mills, in the county of Monroe and State of West Virginia, have invented a new and valuable Improvement in Fanning-Mills; and I do hereby declare that the following is a full, clear, and exact description of the construction and operation of the same, reference being had to the annexed drawings, making a part of this specification, and to the letters and figures of reference marked thereon.

Figure 1:
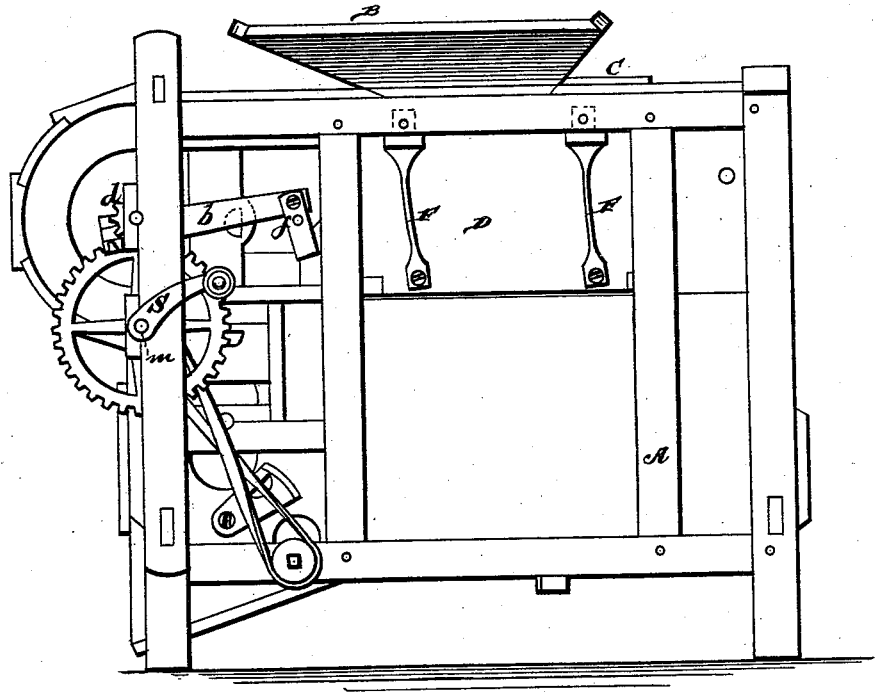
Figure 2:
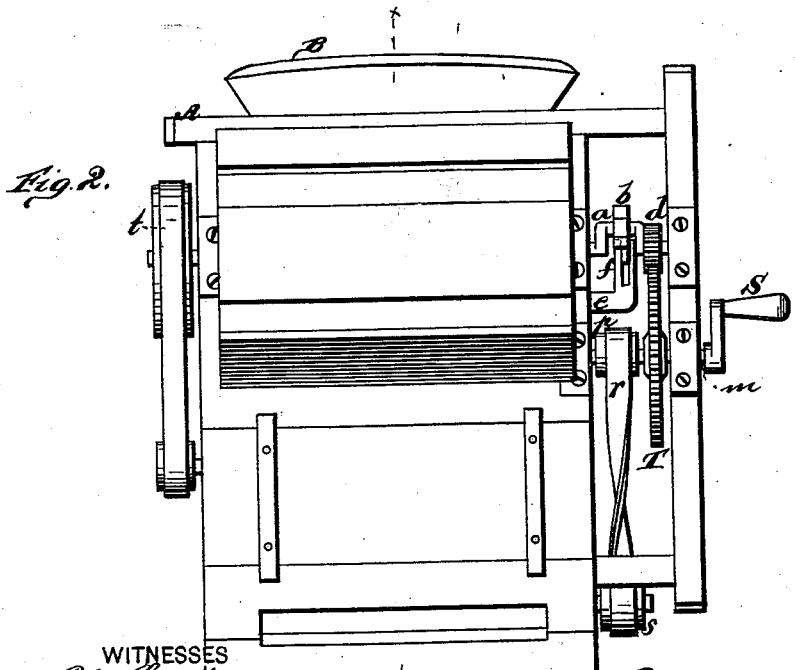
Figure 3:
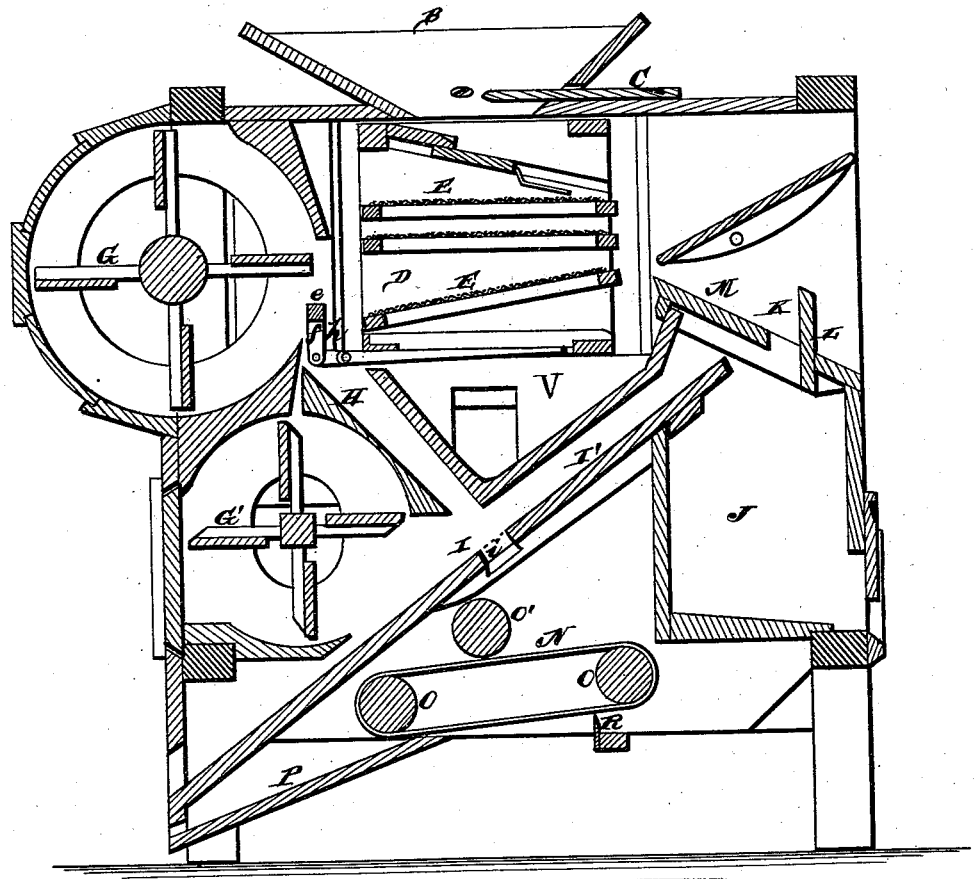

Figure 1 of the drawings is a representation of a side elevation of my fanning-mill. Fig. 2 is an end view, and Fig. 3 is a vertical central section, of the same.

The nature of my invention consists in the construction and arrangement of a fanning-mill, as will be hereinafter more fully set forth.

The annexed drawings, to which reference is made, fully illustrate my invention.

A represents the frame-work of my fanning-mill, provided at the top with a hopper, B, having a slide, C, for regulating the feed. Below the hopper B, within the frame, is the riddle-box D, with screws E E, constructed and arranged in any of the known and usual ways. The riddle-box D is suspended by means of side springs F F, so arranged that the box will have a longitudinal shaking movement instead of a side movement.

In my fanning-mill I use two fans, G and G', the upper fan, G, being larger than the other. The object of the upper or large fan, G, is to blow out the light dirt, such as chaff and dust, and to blow just hard enough to do so without blowing any grain over. This fan blows through the riddles E, and then the grain falls from the riddles down into the draft of the small fan, G', which is very swift, but blowing upward, and, the grain being partly clean, it can receive a swift draft without being blown over, and yet is separated from the small heavy dirt.

One large fan only will blow some grain over in the chaff, and then, when the grain is screened, it passes out without coming in contact with a finishing or second draft. This is obviated by using two fans, as described.

The advantages of arranging the riddle-box so as to have an end shake instead of a side shake are that the frame of the machine need not be wider than the riddle-box, which it must be if the shoe is shaken; otherwise the machine will not creep on the floor near so much, because the jolt is endwise instead of sidewise.

Instead of having the crank from which motion is communicated to the riddle-box in the center of the fan-shaft, and the fan-paddles cut open to give room for the pitman, the crank $a$ and pitman $b$ are arranged outside, near the pinion $d$ on the journal of the upper fan, leaving the fan-paddles intact, which gives a better draft.

Across the machine, between the fan G and the riddle-box, is placed a rocking shaft, $e$, having an arm, $f$, extending upward at one end, and to this arm the pitman $b$ is connected; and this end of the pitman can be adjusted up and down on the arm $f$, so as to give a longer or shorter stroke, as required. In the center of the rocking shaft $e$ is an arm, $h$, extending downward, and this arm is coupled to the center of the shaker or riddle-box D.

It will be seen that the pitman and the riddle-box always work in opposite directions—that is, alternately meeting and separating—which balances the jolt to a great extent.

If double boxes are required, the rocking shaft $e$ can have a cross-piece in the center and each end coupled to its respective box, thus enabling one pitman on the outside to work double boxes, as well as only one.

The grain passes off the screen-riddle at the end next to the fan, and falls on the incline H just over the small fan G', and then falls into the main spout I. As the grain falls from H to I it receives the second draft, which takes out all small heavy dirt except the large heavy cockle; but such as rotten grain, rat-litter, light cockle, cheat, smut, &c., are blown up through the main spout, and fall into the waste-box J, the lightest portion passing out at K. All the heads of wheat and stuff that shake off at the mouth of the riddle-box fall down on an incline, M, which conducts them through the draft of the small fan into the waste-box J, and all the dust and light stuff that are worthless are blown outside. The good grain passes on down the main spout under the small fan and falls on the floor.

When it is desired to get every grain of cockle out of seed-wheat, the lid L of the waste-box may be raised and the upper half, I', of the bottom of the main spout drawn up two or three inches to form an opening at $i$, which will let the wheat fall through on an endless-cloth cockle-screen, N, placed around rollers O O, as shown. The wheat falls off on the incline P, under the lower roller, and then on the floor, while the cockle sticks into the cloth N, being pressed into the same by a roller, O', until it is scraped off by a scraper, R, on the under side near the upper roller, and the cloth comes back clean of cockle as it receives the wheat. The cockle falls down on the floor under the scraper.

The machine is driven by a crank, S, on the end of a shaft, $m$, or by any means for rotating said shaft. On the shaft $m$ is a cog-wheel, T, which meshes with a pinion, $d$, on the journal of the upper fan, G. A pulley, $p$, on the shaft $m$ is, by a crossed belt, $r$, connected with a pulley, $s$, on the journal of the lower roller, O, of the cockle-apron. A pulley on the opposite journal of the upper fan is, by a belt, $t$, connected with a pulley on the journal of the lower fan, and thus all the moving parts of the mill obtain their motion from the shaft $m$.

When the cockle-separating mechanism is not needed, the belt $r$ can be taken off; also, when the second-draft or small fan is not needed, the belt $t$ can be taken off. Both of these are of great advantage in cleaning any kind of heavy grain when there is cockle in it; but when cleaning grass-seed the large fan gives draft enough.

V represents the cheat-box under the riddles. The casings of the two fans, as well as other parts of the machine, are provided with sliding dampers or doors for regulating the draft, &c.

What I claim as new, and desire to secure by Letters Patent, is—

1. The combination of the two fans G G', riddle-box D, incline H, and main spout I, as and for the purpose specified.

2. The combination of the endless apron N, passing around the rollers O O, the pressure-roller O', and scraper R, all substantially as and for the purpose specified.

3. In a grain-separator, the combination of the main spout I, having slide I' and opening $i$, with the endless apron N and roller O', substantially as and for the purpose specified.

In testimony that I claim the above I have hereunto subscribed my name in the presence of two witnesses.

ANDREW JACKSON HUMPHREYS.

Witnesses:
 JOHN W. RUDDELL,
 S. RICHARD WATTS.